United States Patent
Theis

(10) Patent No.: US 12,488,267 B2
(45) Date of Patent: Dec. 2, 2025

(54) SHIFT RULE FOR GRADIENT DETERMINATION IN PARAMETERISED QUANTUM EVOLUTIONS

(71) Applicant: University of Tartu, Tartu (EE)

(72) Inventor: Dirk Oliver Theis, Tartu (EE)

(73) Assignee: University of Tartu, Tartu (EE)

( * ) Notice: Subject to any disclaimer, the term of this patent is extended or adjusted under 35 U.S.C. 154(b) by 824 days.

(21) Appl. No.: 17/856,357

(22) Filed: Jul. 1, 2022

(65) Prior Publication Data

US 2024/0005188 A1  Jan. 4, 2024

(51) Int. Cl.
  G06N 10/20 (2022.01)
  G06N 10/80 (2022.01)

(52) U.S. Cl.
  CPC ............ G06N 10/20 (2022.01); G06N 10/80 (2022.01)

(58) Field of Classification Search
  None
  See application file for complete search history.

(56) References Cited

U.S. PATENT DOCUMENTS

| | | |
|---|---|---|
| 10,275,717 B2 | 4/2019 | Babbush et al. |
| 10,332,023 B2 | 6/2019 | Mezzacapo et al. |
| 10,846,366 B1 | 11/2020 | Otterbach et al. |
| 10,984,152 B2 | 4/2021 | Rubin |
| 11,023,638 B2 | 6/2021 | Parrish et al. |
| 11,055,626 B2 | 7/2021 | Babbush et al. |
| 11,157,828 B2 | 10/2021 | Wiebe et al. |

(Continued)

FOREIGN PATENT DOCUMENTS

| | | | |
|---|---|---|---|
| EP | 2769313 B1 | 8/2016 | |
| EP | 4242935 A1 * | 9/2023 | ............. G06N 10/40 |

(Continued)

OTHER PUBLICATIONS

Banchi et al. "Measuring Analytic Gradients of General Quantum Evolution with the Stochastic Parameter Shift Rule", Quantum, May 20, 2020.
Sweke et al. "Stochastic gradient descent for hybrid quantum-classical optimization", Oct. 2, 2019.
Theis, "Optimality of Finite-Suport Parameter Shift Rules for Derivatives of Variational Quantum Circuits", Mar. 22, 2022.

(Continued)

*Primary Examiner* — Ryan Barrett
(74) *Attorney, Agent, or Firm* — EIP US LLP

(57) ABSTRACT

A hybrid computing system configured to estimate a derivative of a parameter-dependent physical quantity that is dependent on a first control parameter θ of a parameterised quantum evolution executed by the quantum computing system. The classical computing system determines, based on an input bounding value and phase-correction value, a subset multiset of shift-values which define an equivalent subset multiset of trial control parameter values and corresponding weighting values and summation factors such that the trial control parameter values obey a targeted probability distribution. The quantum computing system executes the parameterised quantum evolution at the trial control parameter values and measures a parameter-dependent physical quantity for each trial control parameter value. On the classical computing system, the measurement results from these measurements are combined with the weighting values and summation factors to calculate at an estimate of a phase-correction-scaled derivative of the parameter-dependent physical quantity.

20 Claims, 8 Drawing Sheets

(56) References Cited

U.S. PATENT DOCUMENTS

| | | | | |
|---|---|---|---|---|
| 12,086,091 | B2* | 9/2024 | Mohseni | G06F 13/4068 |
| 2017/0351967 | A1* | 12/2017 | Babbush | G06N 10/00 |
| 2021/0182721 | A1 | 6/2021 | Li et al. | |
| 2021/0183476 | A1 | 6/2021 | Mitarai et al. | |
| 2022/0172096 | A1* | 6/2022 | Rudolph | G06N 10/40 |
| 2023/0267357 | A1* | 8/2023 | Wang | G06N 10/20 706/62 |
| 2023/0377693 | A1* | 11/2023 | Krompiec | G16C 10/00 |
| 2025/0139487 | A1* | 5/2025 | Elfving | G06N 10/20 |
| 2025/0209356 | A1* | 6/2025 | Elfving | G06N 10/20 |

FOREIGN PATENT DOCUMENTS

| | | |
|---|---|---|
| WO | 2013056375 A1 | 4/2013 |
| WO | 2022101483 A1 | 5/2022 |

OTHER PUBLICATIONS

Wierichs et al. "General parameter-shift rules for quantum gradients", Jul. 21, 2021.
Schuld et al. "Evaluating analytic gradients on quantum hardware", Nov. 27, 2018.
Vidal et al. "Calculus on Parameterized Quantum Circuits", Dec. 31, 2018.
Koczor et al. "Quantum Analytic Descent", Arxiv.org, Cornell University Library, May 13, 2022.
Kiss et al. "Quantum Neural Networks Force Fields Generation", Arxiv.org, Cornell University Library, Mar. 9, 2022.
International Search Report and Written Opinion dated Oct. 4, 2023 for PCT Application No. PCT/EP2023/068112.

* cited by examiner

SHIFT RULE FOR GRADIENT DETERMINATION IN PARAMETERISED QUANTUM EVOLUTIONS

BACKGROUND OF THE INVENTION

Field of the Invention

This disclosure is concerned with hybrid quantum/classical computing utilising parameterised quantum evolutions, and has particular relevance to determining the gradient, or partial gradient, of a cost function at a parameter value.

Description of the Related Technology

In the context of noisy intermediate-scale quantum (NISQ) computing, there is a particular interest in quantum algorithms which employ parameterised quantum evolutions, wherein a controlled quantum system is subject to a, or many, quantum evolutions parameterised by a set of real-number control values. Such parameterised quantum evolutions can be found in a variety of computing approaches: hybrid classical-quantum algorithms, such as quantum variational eigensolvers and quantum approximate optimization algorithms, and algorithms used in digital-analog quantum simulators and digital-analog quantum computation. Analog quantum simulators are based on a controllable quantum system whose effective dynamics map to a model system of interest. In digital quantum computation schemes, algorithms are based on sequential application of one and two-qubit gates. In digital-analog quantum computing, both digital and analog approaches are employed. These approaches can realise simulations of molecules and condensed matter materials, quantum machine learning and other quantum artificial intelligence, as well as some approaches to quantum-based combinatorial optimization.

In general, the approach of quantum algorithms employing such parameterised quantum evolutions is to subject the controlled quantum system to the parameterised quantum evolution for a set of control parameter values and make a measurement on the quantum system. This measurement represents in itself or determines a loss or cost function which is minimised through an optimisation process. An updated set of control parameter values is determined by a classical algorithm running on a classical computing system based on the measurements of the quantum system, and the parameterised quantum evolution executed again using these new control parameter values. Through an iterative process, the control parameter values are updated until that the quantum algorithm satisfies an optimisation condition.

One particular technique implemented by the classical algorithms running on the classical computing system is gradient descent e.g. Stochastic Gradient Descent, whereby the gradient of the cost, or loss, function with respect to a particular control parameter is used to inform the selection of new control parameter values. In the training of classical neural networks, gradient descent techniques outperform derivative-free optimisation methods, and this appears also to be the case in the realm of quantum algorithms employing parameterised quantum evolutions.

One particular way of determining the derivative is through numerical differentiation. Such a method may use, for example, a finite difference approximation, whereby the evolution is performed with a control parameter set to a first value, and then run again with the control parameter set to a second value. The difference in the value of the cost or loss function (measured as an expectation value over many measurements of the quantum system) divided by the difference between the first and second values of the control parameter provides an approximation of the gradient around this point. Due to fundamental randomness in quantum mechanical measurements, a procedure for processing measurement outcomes constitutes an estimator, whose bias (approximation error) and variance are important. For the finite difference approximation, the approximate error decreases with smaller differences in parameter control values, but the variance increases. This limits the effectiveness of this approach, as the variance of the estimator directly influences how resource-intensive a hybrid quantum-classical computation will be, with higher variance demanding more iterations in the stochastic optimization algorithm.

Another particular way of determining the derivative is to obtain an estimate for the exact (approximation error free) derivative through implementation of a parameter shift rule. Some quantum evolutions, such as the quantum gates typically implemented in parameterised quantum circuits, admit parameter shift rules which allow for the exact (up to available numerical precision) derivative at a target control parameter value to be estimated with a constant variance depending only on the gate itself. This is done by running the quantum circuit at a number of control parameter values shifted from the target control parameter value, and forming a sum of the measurement results, weighted with real-number coefficients. The precise selection of the shifted control parameter values and their real-number coefficients is specific to the quantum gate being applied.

The parameter shift rule described above supposes that the parameter $\theta$ enters into the quantum evolution in the form of a unitary $$e^{\frac{i\theta A}{\hbar}}.$$

However, this assumption does not hold in current NISQ approaches that aim to demonstrate a quantum advantage over classical computers. Instead, the parameter $\theta$ enters into the quantum evolution in the form $$e^{\frac{i(\theta A+B)}{\hbar}}.$$

This can arise, for example, in the situation when the quantum system is subject to an always-on entangling Hamiltonian (e.g., an Ising Hamiltonian linking all qubits) represented by the B-component, and a single qubit drive is switched on for a short time, represented by the $\theta A$. This concept has been proposed and is used for several qubit technologies, with several different ways in which the two Hamiltonians can be related. The B-component can also occur due to unavoidable drift in the quantum control mechanisms. The presence of the B-component in the Hamiltonian prevents the above-mentioned parameter shift rule from being applicable.

To address this, there is a known stochastic parameter shift rule (SPSR) which determines control parameter values to obtain exact derivates from an arbitrary parameterised quantum evolution. However, the known SPSR requires the parametric quantum evolution to be modified beyond simply altering the value of the control parameters. This modification of the quantum evolution requires an update of the scheduling of the control pulses, which involves either resetting control electronics (e.g. by writing a new program onto a Field Programmable Gate Array), which is a time consuming process on the order of a second and thus unsuitable for iterative schemes such as stochastic gradient descent, or requiring a large number of different programs be stored on the FPGA, one for every parameter.

Additionally, in situations where the quantum evolution $$e^{\frac{i\theta A}{\hbar}}$$

cannot be switched on separately (in other words, where the B-component of the Hamiltonian cannot be switched off), the SPSR method cannot be implemented without an approximation error. To reduce that approximation error, the SPSR scheme demands higher and higher drive strengths for shorter and shorter durations, which at best poses difficulties for some quantum control methods. At worst, it runs into technical limitations relating to the Fourier Uncertainty Principle, as the drive signal has to be localised both in time and in frequency: The pulses used in quantum control are, generally speaking, as short as possible already, and making them orders of magnitude shorter is problematic.

There is therefore a desire for a method of obtaining derivatives in quantum evolutions that can handle perturbed parameterised evolutions due to, for example, unavoidable drifts or arising from necessary analog control, but overcomes the approximation error and does not require fundamental re-design of the underlying quantum evolutions.

SUMMARY

According to a first aspect of the present invention, there is provided a hybrid computing system comprising a quantum computing system and a classical computing system, the quantum computing system comprising a quantum system having one or more quantum devices. The hybrid computing system is configured to estimate a derivative of a parameter-dependent physical quantity that is dependent on a first control parameter $\theta$ of a parameterised quantum evolution executed by the quantum computing system. The classical computing system determines, based on an input bounding value and phase-correction value, a subset multi-set of shift-values which define an equivalent subset multiset of trial control parameter values and corresponding weighting values and summation factors such that the trial control parameter values obey a targeted probability distribution. The quantum computing system executes the parameterised quantum evolution at the trial control parameter values and measures a parameter-dependent physical quantity for each trial control parameter value. On the classical computing system, the measurement results from these measurements are combined with the weighting values and summation factors to calculate at an estimate of a phase-correction-scaled derivative of the parameter-dependent physical quantity. In this way, the derivative can be provided to a gradient-descent optimiser to optimise the control parameters of a quantum algorithm.

In examples the phase-correction value is zero, such that the hybrid system calculates the estimate of the derivative of the expectation-value function, without phase-correction scaling.

In examples hybrid computing system may be further configured to calculate the estimate of the derivative of the expectation-value function from the estimate of the phase-correction-scaled derivative.

In examples the sub-multi-set of shift values is constructed by randomly sampling the set of all shift values according to the targeted probability distribution and the weighting values are set to unity.

In examples the sub-multi-set of shift values is constructed by randomly sampling a value the set of all shift values according to the targeted probability distribution and adding the value and its additive inverse to the sub-multi-set and the weighting values are set to unity.

In examples the sub-multi-set of shift values is constructed deterministically up to a target size, and the weighting values are selected according to the target probability distribution.

In examples the sub-multi-set of shift values is constructed semi-deterministically in such a way to minimise the variance of a random variable which approximates the targeted probability distribution.

In examples the classical computing system is further configured to pass each trial control parameter values through a parameter folding function such that no trial control parameter value differs from the first control parameter value by more than a parameter shift limit value.

In examples the parameter value function has the property $\tau(x)-x \in p\mathbb{Z}=\{pk|k \in \mathbb{Z}\}$, where $$p := \frac{k}{\gamma},$$

where p is a real number, k is a positive integer and $\gamma$ is a is a common divisor of the eigenvalues of the first parameterised quantum evolution.

In examples, the parameter value function is $$\tau(x) = \begin{cases} -c - ((-x) \% p), & \text{if } x \leq -c - p; \\ x, & \text{if } x \in ]-c-p, +c+p[; \\ +c + (x \% p), & \text{if } x \geq +c + p. \end{cases}$$

where c is a real number, c=m·p where m is a positive integer, and where % p stands for the remainder in [0, p[ when dividing by p.

In examples, the input bounding value is based on the largest and smallest eigenvalue of the first parameterised quantum evolution.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
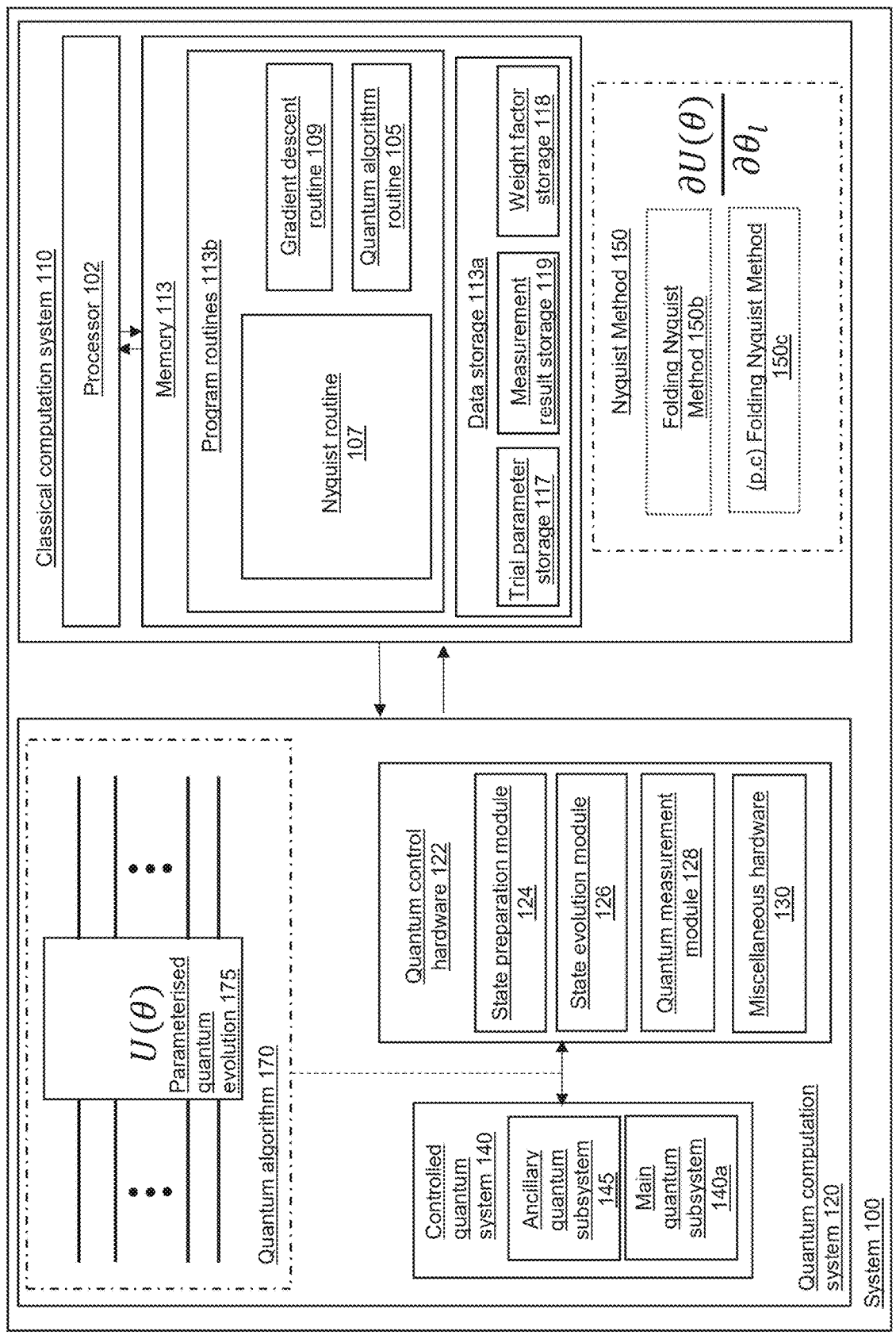
FIG. 1 shows a schematic diagram of an exemplary hybrid quantum-classical computing system which is used to perform a parameterised quantum evolution as part of a quantum algorithm and utilise the Nyquist-shift method described herein.

FIG. 1 schematically shows, by way of example, the main components of a hybrid quantum-classical computing system 100 comprising a quantum computation system 120 and classical computation system 110, the quantum computation system 120 and the classical computation system 110 cooperating to execute a hybrid classical-quantum solution. The quantum computation system 120 includes quantum control hardware 122 and a controlled quantum system 140. The quantum control hardware 122 interacts with the controlled quantum system 140 in accordance with instructions from the classical computing system 110 so as to modify the quantum state of the controlled quantum system 140.

Typically, a series of operations are performed on the quantum system 140 in accordance with control data from the classical computing system 110 to implement a quantum algorithm 170. In the context of controlled quantum system 140 formed by qubits, these operations can be represented by a framework of quantum gates, which operate on single and multiple qubits to evolve the quantum system from a first quantum state to a second quantum state. The process of evolving the quantum state of the controlled quantum system 140 according to a series of operation, whether or not the controlled quantum system 140 is formed by qubits, is referred to as a quantum evolution 175.

The quantum evolution 175 of the quantum system 140 is parameterised by a control parameter $\theta$, or set of control parameters, $\theta = (\theta_a, \theta_b, \ldots, \theta_n)$. These control parameters may take discrete values or continuous values, according to the choice of quantum algorithm 170. A cost, or loss, function is defined which, when minimised, encodes the solution to the problem to be solved. The cost function can be evaluated by measuring the expectation value of observables of the quantum system 140. The minimisation of the cost function involves the classical computation system iteratively selecting a value for one or more control parameters and initiating a quantum evolution 175 in accordance with the selected control parameters, receiving measurement data from the quantum computation system 120 and calculating a corresponding value of the cost function, and then selecting a new value for the one or more parameters that is expected to result in a reduction of the value of the cost function.

The classical computation system 100 uses an optimisation algorithm in order to determine the selection of the new parameter values. In general, the optimisation algorithm requires, as an input, the derivative of the cost function with respect to a control parameter, at the current control parameter value. The optimisation algorithm produces, as an output, a new value for the control parameter which will be used in the next iteration of the optimisation routine. In this example, the classical computation system 100 uses a stochastic gradient descent algorithm in order to inform what the new parameter values used in the parameterised quantum evolution 175 should be, but other gradient-based methods may be used in other examples.

In order to acquire the derivative of the cost-function described above, the hybrid quantum-classical computing system 100 utilises an analytical method which will hereafter be referred to as the Nyquist-shift method 150 or a variant thereof, Folding-Nyquist-shift method 150b or (p,c) Folding-Nyquist-shift method 150c, the specific details of which will be described later.

The quantum computation system 120 is comprised of quantum control hardware 122 which interfaces with a controlled quantum system 140. The controlled quantum system 140 is a physical system whose quantum properties are controllable in the sense that the system 140 can be prepared into a given quantum state, evolved under a parameterised quantum evolution 175 according to the quantum algorithm 170, and subsequently measured. The controlled quantum system is, in this example, a system of n qubits, but in other examples may be controlled quantum systems according to other computational schemes such as a continuous-variable scheme or a qutrit scheme. The controlled quantum system 140 includes a quantum subsystem 145 which is likewise controllable such that it can be entangled with a main subsystem 140a, the quantum subsystem 145 being an auxiliary system which may be used in conjunction with a primary portion of the controlled quantum system during the processing of the desired algorithm. Those skilled in the art will appreciate that there are a multitude of physical systems which are suitable for use as the controlled quantum system 140, such as platforms based on photonics, ion traps, quantum dots, nitrogen-vacancies, nuclear magnetic resonance, silicon spin qubits, superconducting qubits, etc. The present invention is not limited to a particular choice of platform for the controlled quantum system 140.

The quantum control hardware 122 comprises a state preparation module 124, a state evolution module 126, a quantum measurement module 128 and miscellaneous hardware 130. The state preparation module 124 is for preparing the controlled quantum system 140 into a given state. The state evolution module 126 is for evolving the controlled quantum system according to the quantum algorithm 170. The state evolution module 126 evolves the controlled quantum state 140 by applying quantum gates, with the gates parameterised by a set of control parameters $\theta$. The quantum measurement module 128 can be used to make a measurement of the controlled quantum system 140. The quantum measurement module 128 measures a physical quantity, or observable, of the quantum system 140 by physically interacting with the quantum system 140 such that a measurement is made. The physical quantity measured by the quantum measurement module 128 is parameter-dependent as it depends on the parameterised quantum evolution 175 applied by the state evolution module 126.

The precise choice of hardware used to implement each module 126, 128, 130 depends on the choice of controlled quantum system 140. For example, photodetectors and polarising beam splitters may be used in a photonic platform for measurement of the controlled quantum system, whereas in a nuclear magnetic resonance platform, measurement is achieved by electronics which measure a voltage signal. The present disclosure is not limited to a particular choice of controlled quantum system and associated quantum control hardware 122, and those skilled in the art would know how to implement state preparation, evolution and measurement for a given choice of controlled quantum system 140. Similarly, it is clear that hardware used for e.g. state preparation may also be used for state evolution, and so the hardware used by each of the modules 124, 126, 128 may be shared between them.

Further, the quantum control hardware contains miscellaneous hardware 130. This hardware may include, for example, field-programmable gate arrays, timing electronics, digital-to-analog converters, cryostats, vacuum systems, etc, depending on what is required to effectively host the controlled quantum system 140 and interface the quantum control hardware with it.

The classical computation system 110 comprises a processor 102 and memory 113. The memory comprises data storage 113a and program routines 113b. The data storage 113a comprises storage for data necessary for, and generated during, the execution of the quantum algorithm 170 and the Nyquist-shift method 150. The memory 113 may be any suitable storage device known to those skilled in the art, such as a hard-drive, solid-state drive, cloud-storage, etc.

The processor 102 executes program routines 113b stored on the memory 113. The overarching scheduling of the instructions provided to the quantum control hardware 122 is provided by execution of the quantum algorithm routine 105 by the processor 102, though the quantum control hardware 122 may store and execute subroutines locally. The Nyquist-shift method 150 and variants 150b, 150c are implemented by the classical computation system 110 through execution of the Nyquist module routine 107 by the processor 102. Optimisation of the parameterised quantum evolution 175 by use of the gradients calculated by the method 150 is performed by the processor 102 executing the gradient descent routine 109.

Communications between the classical computation system 110 and the quantum computation system 120 can be realised by any known method, such as communicating via Ethernet, Local Area Network, Wi-Fi, TCP/IP etc.

The precise architecture of the classical computation system 110, including the processor 102, memory 113 and associated storage 105-119, and communication links between these elements may vary between examples. The classical computation system 110 may, for example, be distributed across one or more classical computers, and across one or more locations. Likewise, the quantum computational system 120 may be located at a separate location from the classical computation system 110 and accessed remotely.

Figure 2:
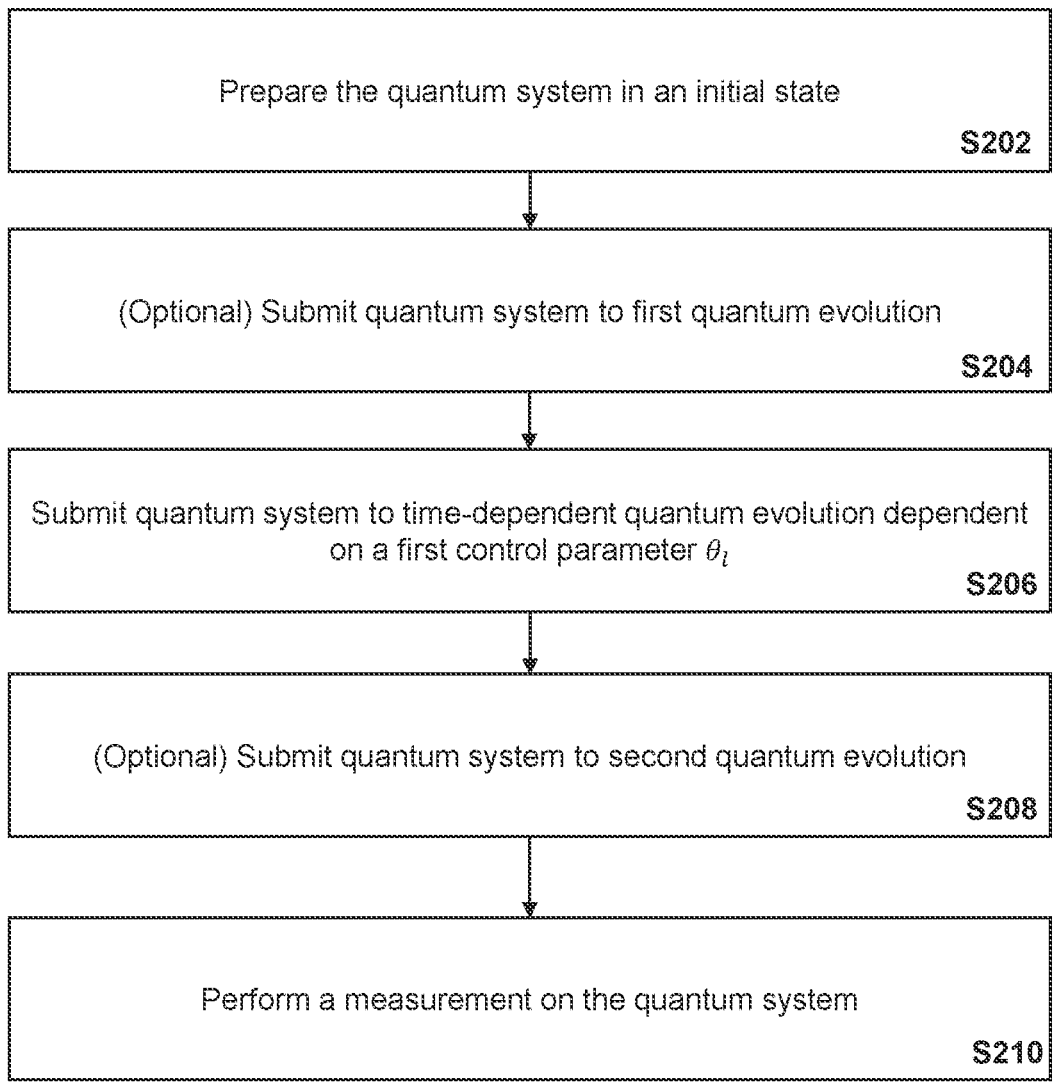
FIG. 2 is a flow chart showing steps executed to perform a parameterised quantum evolution as part of a quantum algorithm.

FIG. 2 illustrates the fundamental process of performing a parameterized quantum evolution dependent on a first control parameter $\theta_I$.

In S202, the quantum system 140 is prepared into an initial state e.g. $|0^n\rangle$, but it will be appreciated that the exact choice of initial state will depend on the quantum algorithm to be implemented and the desired quantum computation to be performed, and the exact choice of initial state or method of preparation is therefore immaterial to the invention.

In S204, the quantum system 140 may undergo a first quantum evolution. It is dependent on the quantum algorithm to be implemented and the desired quantum computation to be performed as to whether this first quantum evolution is implemented or not. This first quantum evolution does not depend on the parameter $\theta_I$, though it may depend on other parameters, and in some examples these other parameters may be optimised together with $\theta_I$. This first quantum evolution may be used, for example, to prepare a problem-specific initial state beyond the state-preparation stage S202.

In S206, the controlled quantum system 140 is submitted to a time-dependent parameterised quantum evolution which is dependent on the first control parameter $\theta_I$. Again, the precise form of the parameterised quantum evolution is dependent on the quantum algorithm to be implemented and the desired quantum computation to be performed. In some examples the control parameter $\theta_I$ is defined at the level of a physical (sub-logical level) variable, such as the intensity or frequency of a control laser pulse, but in other examples it is instead defined at the level of computational operations (logical level), such as a transformation in state-space. Precisely how the parameters enter the quantum evolutions is also decided by the user according to the precise form of the parameterised quantum evolution to be implemented and the desired quantum computation to be performed.

In S208, the quantum system may undergo a second quantum evolution. Like the first quantum evolution in S204, the second quantum evolution is optional, and does not depend on the parameter $\theta_I$. In some examples this second quantum evolution can be used to prepare the state of a particular measurement at S210. Whilst the second quantum evolution, like the first quantum evolution S204, does not depend on the parameter $\theta_I$, it may depend on other parameters, and in some examples these other parameters may later be trained in a similar manner to $\theta_I$.

In S210, an observable of the quantum system is measured. Due to the fundamentally probabilistic nature of measurements made on a quantum system, in practice the entire process S202-S210 will be run multiple times and the measurements averaged to obtain an estimate of the expectation value/cost function. Minimising or reducing the number of measurements to be made to obtain an expectation value can reduce the overall cost of the algorithm 170 in the sense of, for example, required processing time. The exact choice of observable to be measured is again dependent on the quantum algorithm to be implemented and the desired quantum computation to be performed. In general, the measurement determines a loss or cost function. Finding the value of the control parameter $\theta_I$ (or, if there are several control parameters, a value for each of them) which minimises the cost function is the overarching objective of the parameterised quantum evolution paradigm.

The exemplary process described by the above steps S202-S210 is dependent on just one control parameter $\theta_I$ to illustrate the fundamental process of performing a parameterised quantum evolution, but in most examples of parameterised quantum evolutions there will be many such control parameters $\theta$. Further, it is clear to those skilled in the art how to arrange the state preparation S202, evolution S204-208 and measurement S210 steps to implement their desired quantum algorithm.

Figure 3A:
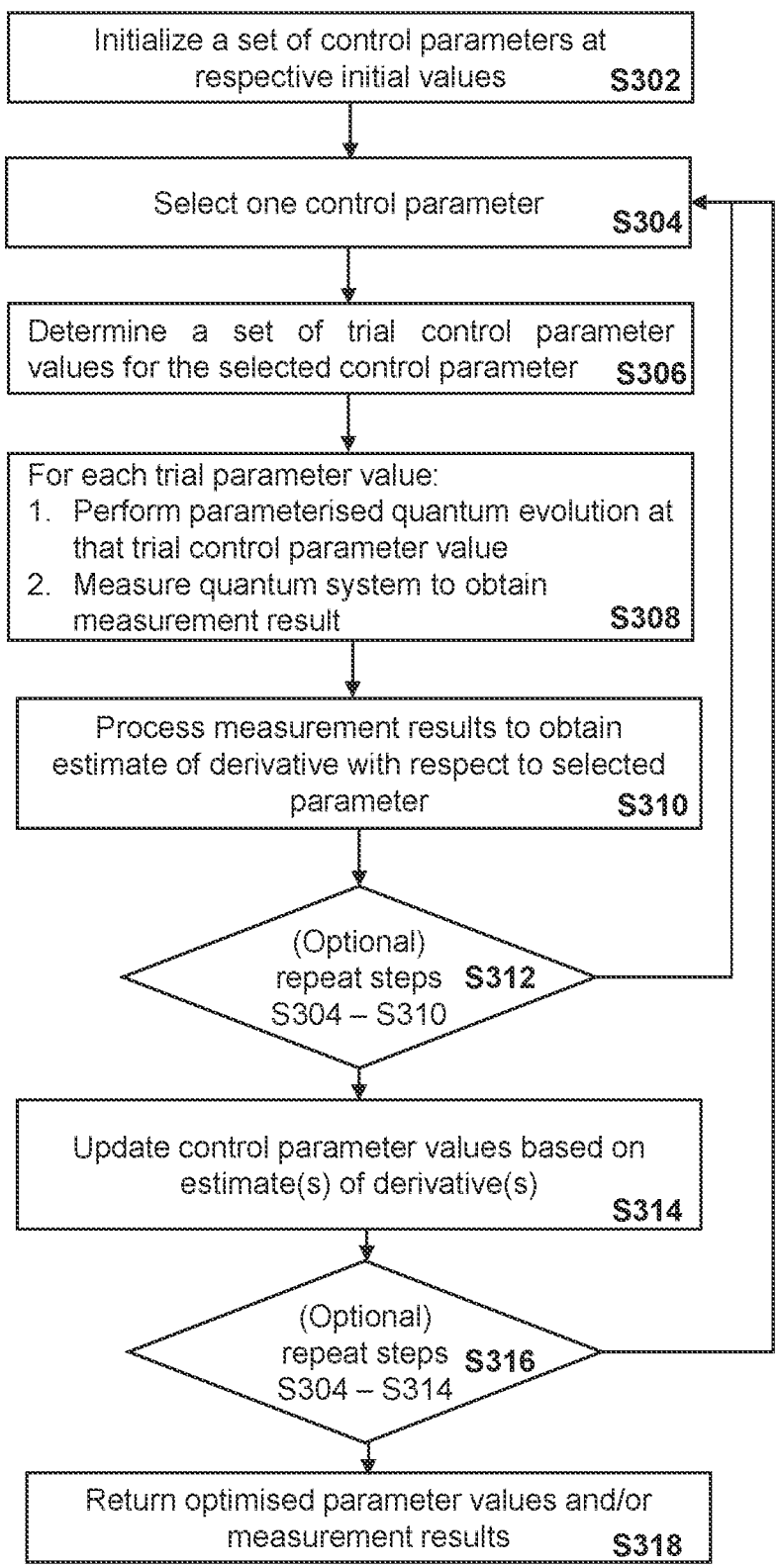
FIG. 3a is a flow chart showing steps performed to optimise a parameterised quantum evolution, the parameterised quantum evolution parameterised by a set of control parameters.

FIG. 3A illustrates the generalised process of how the control parameters $\theta$ associated with the quantum algorithm 170 are optimised by system 100, or in other words, trained. In this example there are a set of control parameters under consideration, e.g. $\theta=(\theta_a, \theta_b, \ldots, \theta_n)$ rather than just a single control parameter as in the example provided in FIG. 2. The objective of the optimisation process is to find the value of each control parameter that minimises the cost function $C(\theta)$.

In S302, the set of control parameters $\theta$ is initialised at respective initial values. The precise choice of respective initial values may be determined in multiple ways known to the skilled person. For example, they may simply be generated at random, or may represent educated guesses based on knowledge of the problem to be solved.

In S304, one of the set of control parameters θ is selected e.g. $\theta_a$. In S302, this is provided with some initial value. The exact choice of which one of the set of control parameters is selected would be according to a routine based on the precise optimisation algorithm to be implemented.

In S306, a subset multiset, hereafter referred to a sub-multi-set of trial control parameter values are determined for the selected control parameter $\theta_a$ currently under consideration. That is, the sub-multi-set of trial control parameter values is a subset of all possible trial control parameter values, and a multiset in that trial control parameter values can be repeated. The sub-multi-set of trial control parameter values are determined by the Nyquist-shift method 150 or variants 150b,c. The trial control parameter values are values for $\theta_a$ at which the parameterised quantum evolution 175 will be performed and measured, such that a derivative of the cost function with respect to $\theta_a$ can be calculated.

In S308, the parameterised quantum evolution is performed for each value of the sub-multi-set of trial control parameter values. This process is substantially the same as that described in FIG. 2 S202-S210. The controlled quantum system 140 is prepared, subject to a quantum evolution parameterised by the trial control parameter value and measured to obtain a measurement result which is an expectation value of the cost function. For each trial control parameter value, this process may be repeated to obtain the expectation value to a required degree of accuracy. A set of measurement results are generated, wherein each measurement result corresponds to a trial control parameter value. This determines the cost function at multiple values of the control parameter $\theta_a$ currently under consideration.

In S310, the measurement results are processed to obtain a new control parameter $\theta_a$ value. As described for S306, multiple known methods exist for determining what the new control parameter $\theta_a$ value should be. The new control parameter value is decided according to a stochastic optimisation method.

Steps S312, S314 and S316 enable the optimisation process across the full set of control parameters θ. S304-S310 are repeated to cycle through all the control parameters, for each control parameter $\theta_x$ perform parameterised quantum evolutions at determined trial control parameter values, and make corresponding measurements. At S312 steps S304-S310 are repeated until all the derivatives of the cost function with respect to each control parameter $\theta_a$, $\theta_b$, ..., $\theta_n$ have been calculated. All the control parameter values are then updated at step S314 according to the implemented optimising algorithm. Steps S304 to S316 are then repeated, iteratively selecting new control parameter values and trial control parameter values until the cost function C(θ) has been minimised. The person skilled in the art will recognise that there are several different ways to performing steps S312-S16 based on gradient descent methods, and the precise manner in which the parameters are optimised by the gradient descent method will vary from implementation to implementation in a way which is immaterial to the application of the method 150.

At S318, the optimisation is completed as a set of optimised parameter values which minimise the cost function C(θ) have been found. Depending on the precise choice of quantum algorithm, the solution to the problem may be encoded in the parameter values or in the measurement results, and so either may be output at this step.

Steps S302-306 and S310, S314, S318 takes place on the processor 102 of the classical computing system 110 through executing the relevant program routines stored in the memory 113b.

Step S308 takes place on the quantum computation system 120, but the precise scheduling may be guided by the quantum algorithm routine 105. In this example, the state preparation module 124 prepares the controlled quantum system 140 into an initial quantum state, state evolution module 126 submits the controlled quantum system 140 to the parameterised quantum evolution according to the trial control parameter, and the quantum measurement module 128 measures the controlled quantum system 140 to generate the measurement result.

Figure 3B:
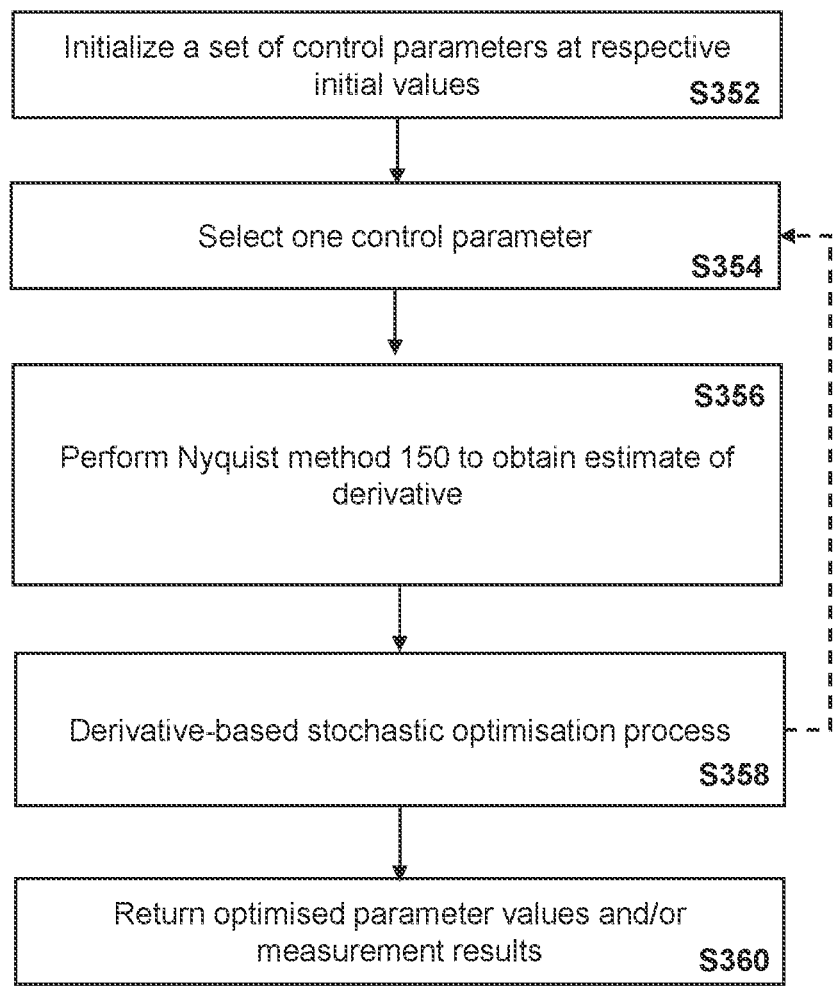
FIG. 3b is a flow chart showing steps performed to optimise a parameterised quantum evolution using the Nyquist-shift method disclosed herein.

FIG. 3B illustrates the process of optimising the parameterised quantum evolution described in FIG. 3A, specifically using the Nyquist-shift method 150. Steps 352 and 354 are substantially the same as steps 302 and 304. Step S356, in which the Nyquist-shift method is implemented, effectively replaces the steps S306-310. Steps 312-316 are described here by step S358, which covers any optimisation of the parameter values which occurs by known derivative-based methods e.g. stochastic gradient descent.

Having described the general paradigm of parameterised quantum evolutions and the optimisation process into which the presently disclosed Nyquist-shift method is implemented, the details of the Nyquist-shift method 150 necessary for implementation will now be presented. In this disclosure, we assume units normalised so that the Planck constant h=1, which implies that $\hbar=1/2\pi$. Any person skilled in the art can perform the necessary scaling to use the disclosure for other units, for example other values of h, in particular, for the common normalization $\hbar=1$ (i.e., h=2π).

The method 150 provides a way to calculate the derivative of the cost function of a parameterised quantum evolution dependent on a first control parameter, at a first value of the first control parameter and with respect to the first control parameter, as part of a hybrid quantum-classical scheme implementing a parameterised quantum evolution. It does this by determining the values for the trial control parameter values and coefficients for each of the trial control parameter values. Performing the parametrised quantum evolution on the controlled quantum system at these trial control parameter values and combining with their associated coefficients allows for the estimation of an exact derivative. This derivative can then be used by a known gradient descent optimiser to optimise the parameterised quantum evolution.

The method 150 is a parameter shift rule. One particular known parameter-shift rule states that for a parameterised quantum evolution which can be written as a unit-time evolution $e^{-i\theta H/\hbar}$, where H is the Hamiltonian, the gradient of the cost function C(θ) with respect to a parameter $\theta_l$ can be estimated exactly (without bias) by evaluating the parameterised quantum evolution at a number of values of the cost parameter $\theta_l$. However, in reality the parameterised evolution may be perturbed by e.g. environmental or quantum control influences. This results in a unit-time evolution $e^{i(\theta A+B)/\hbar}$ with H≈−(θA+B), where the θA term represents the targeted quantum evolution and the B term represents a perturbation due to e.g. quantum control. This disrupts the known parameter-shift rule and introduces an unacceptable bias into the measurement of the gradient. The method 150, however is robust to such perturbations, and so can be used to obtain the exact derivative of a unit-time evolution of the form $e^{i(\theta A+B)/\hbar}$, for arbitrarily large B.

Underpinning the method 150 is the fact that the exact derivative of the expectation-value function with respect to the first control parameter $\theta_0$ at a value of the first control parameter can be calculated according to the equation:

$$f'(\theta_0) = \sum_{\substack{s=\left(n-\frac{1}{2}\right)/2K \\ n \in \mathbb{Z}}} \frac{2\pi K(-1)^{2Ks+\frac{1}{2}}}{(2\pi Ks)^2} f(\theta_0 - s),$$

where s is a parameter shift value drawn from a set parameterised by K, where K relates to the Fourier spectrum of the expectation-value function. Importantly, the sequence ½ (fractions without numerators) defines a probability distribution on the set $S_K = \{(n-\frac{1}{2})/2K | n \in \mathbb{Z}\}$. For K=½ and $\theta_0$=½ this equality can be motivated as taking the derivative of the Nyquist-Shannon-Whittaker interpolation formula; other values of $\theta_0$ can then be understood by translation, and other values of K by dilation.

Firstly, implementation of the method 150 is subject to conditions of the nature of the parameterised quantum evolution to which the controlled quantum system 140 is subject. The present method 150 is applicable providing, firstly, that the parameterised quantum evolution can be approximated as a unitary evolution $e^{-i(\theta A+B)/\hbar}$.

Secondly, the bounds for the Fourier spectrum of the expectation-value function must be found in order to realize the method 150. The expectation-value function is the function which maps the parameter value, $\theta$, to the expectation value of the measurement and can be written mathematically as:

$$f(\theta) = tr(M_0 e^{i(\theta A+B)/\hbar} \rho e^{-i(\theta A+B)/\hbar}).$$

where $\rho$ denotes the density operator representing the state of the quantum system after step S204, and M denotes the measurement operator for the measurement S210 in the picture defined by the evolution S208. For example, if step S208 effects a state change that can be described by a Kraus operator $\sigma \mapsto \Sigma_j E_j \sigma E_j^\dagger$ then $M = \Sigma_j E_j^\dagger M_0 E_j$, where $M_0$ represents the operator measured in step S210. Matching the adopted normalisation h=1, the Fourier transform $$\hat{f}(\xi) := \int e^{-2\pi i \xi \theta} f(\theta) d\theta$$

is used, though the person skilled in the art can perform the necessary scaling for their preferred variant of the Fourier transform.

The way in which the bounds of the Fourier spectrum of the expectation-value function are found will vary depending on the precise implementation of the method 150. For example, they may be calculated manually a priori and hard-wired into the implementation, but in other examples a method which extracts them from the data about the operator A may be used. Such data may stem from a calibration process for the control of the quantum system. Here we describe some methods on how the bounds can be found.

An interval containing the Fourier spectrum can be derived from bounds on the spectrum of A. That is to say, if $\lambda_{min}(A) \leq A \leq \lambda_{max}(A)$ holds for all elements $\lambda$ in the spectrum of A, then the Fourier spectrum of the expectation-value function is contained in the interval [−K, +K] where $K := \lambda_{max}(A) - \lambda_{min}(A)$, a result which can be proven using the Lie-Trotter product formula. Hence, the method 150 is applicable if upper and lower bounds on the spectrum of A are known a-priori or can be extracted from data about the operator A.

In some examples of the disclosed method 150, additional knowledge about the operators A and B, used to approximate the evolution in S206, the initial state S202, the first quantum evolution S204, the second quantum evolution S208 and the measurement S210 can be combined to find smaller intervals containing the Fourier spectrum of the expectation-value function.

Figure 4:
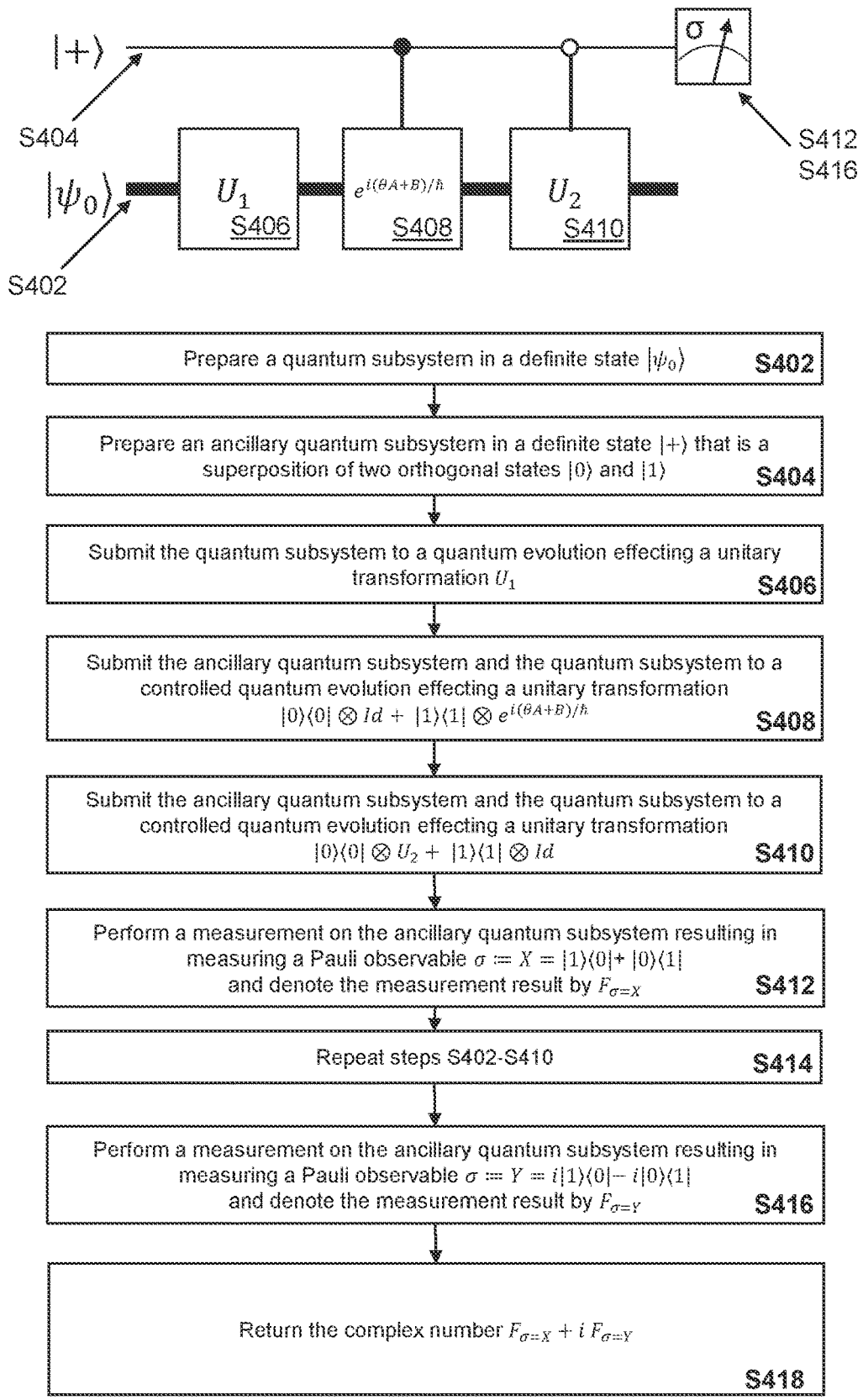
FIG. 4 is a flow chart showing steps performed to measure matrix values of a unitary applied during a parameterised quantum evolution

One way to achieve this is by relying on complex-valued measurements. FIG. 4 displays a particular implementation of the process illustrated by FIG. 2 on a system 100, the particular implementation allowing for the measurement of matrix elements $u(\theta) := \langle \phi | e^{-(\theta A+s)/\hbar} | \psi \rangle$. This particular implementation is just one example of a method which a person skilled in the art would know in order to readily check whether the parameterised quantum evolution is suitable.

In step S402, a main quantum subsystem 140a of the controlled quantum system 140 is prepared into a definite state $|\psi_0\rangle$.

In step S404, an ancillary quantum subsystem 145 of the controlled quantum system 140 is prepared into a definite state $|+\rangle$ that is a superposition of orthogonal states $|0\rangle$ and $|1\rangle$.

In step S406, the quantum subsystem 140a is submitted to a quantum evolution effecting a unitary evolution $U_1$. The combined effect of S402 and S406 is to bring the quantum system into the state $|\psi\rangle$, i.e., $|\psi\rangle = U_1 |\psi_0\rangle$, see above.

In step S408, the ancillary quantum subsystem 145 and the quantum subsystem 140a are subjected to a controlled parameterised quantum evolution which effects a unitary transformation $|0\rangle\langle 0| \otimes \text{Id} + |1\rangle\langle 1| \otimes e^{-i(\theta A+B)/\hbar}$.

In step S410, the ancillary quantum subsystem 145 and the quantum subsystem 140a are subjected to a controlled quantum evolution which effects a unitary transformation $|0\rangle\langle 0| \otimes U_2 + |1\rangle\langle 1| \otimes \text{Id}$. The unitary $U_2$ is chosen in such a way that it would result in the state $|\phi\rangle$, if applied to $|\psi\rangle$, i.e., $|\phi\rangle = U_2 |\psi\rangle$.

In step S412, a measurement is performed on the ancillary quantum subsystem 145, resulting in measuring a first Pauli observable $\sigma := X = |1\rangle\langle 0| + |0\rangle\langle 1|$ to produce a measurement result $F_{\sigma=X}$.

At step S414, steps S404-S410 are repeated such that a second Pauli observable can be measured.

In step S416, the system having been re-prepared at step S414, a measurement is performed on the ancillary quantum subsystem 145, resulting in measuring a second Pauli observable $\sigma := Y = i|1\rangle\langle 0| - i|0\rangle\langle 1|$ to produce a measurement result $F_{\sigma=Y}$.

At step S418, a complex number $F_{\sigma=X} + iF_{\sigma=Y}$ is returned. The measurement result that is returned in step S418 is a combination of two real-valued measurements in the steps S412 and S416, resulting, effectively, in measuring the non-Hermitian observable $M = X + iY$.

Figure 5:
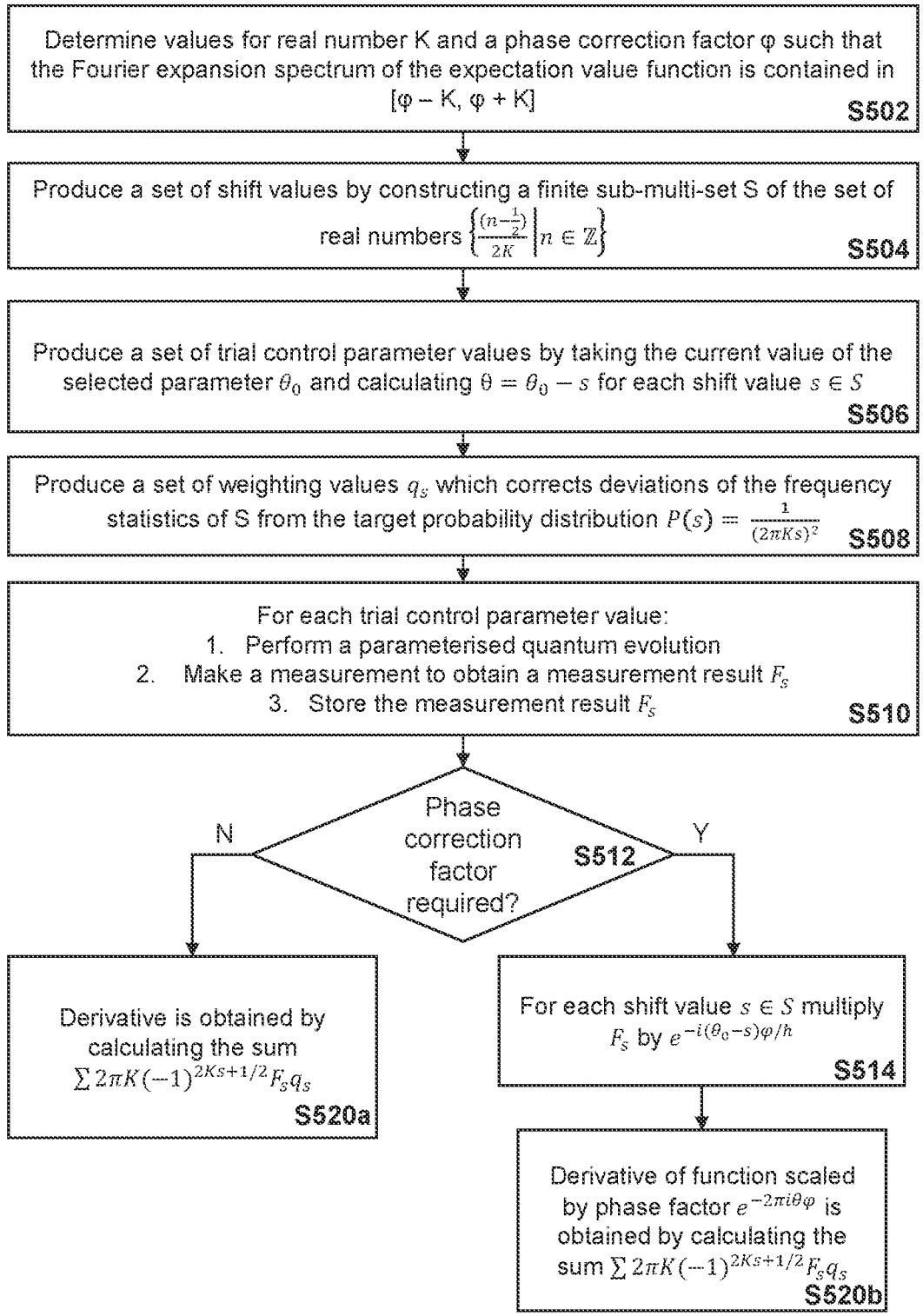
FIG. 5 is a flow chart showing steps performed in implementing the Nyquist-shift method described herein.

In FIG. 5, this situation is covered by the possibility to use a phase correction factor: If the Fourier spectrum of the expectation-value function is contained in an interval $[\varphi - K, \varphi + K]$, then the method 150 is applicable, by multiplication of the measurement results by $e^{-i\theta\varphi/\hbar}$. The result of the method will estimate the derivative, at the parameter value $\theta_0$, of the function $$\theta \mapsto e^{-\frac{i\theta\varphi}{\hbar}} \cdot f(\theta)$$

which contains the phase correction factor $e^{-i\theta\varphi/\hbar}$ as an artefact. The artefact can be removed in the usual ways, e.g., by obtaining, through measurements, an estimate of the expectation value $f(\theta)$ at $\theta_0$ and using the equation $$\frac{d}{d\theta}\left(e^{-i\theta\varphi}f(\theta)\right)_{\theta:=\theta_0} = e^{-i\theta\varphi/\hbar} \cdot f'(\theta_0) - i\theta_0\varphi/\hbar \cdot e^{-\frac{i\theta\varphi}{\hbar}} \cdot f(\theta_0).$$

Returning to FIG. 4, the Fourier spectrum of the complex-valued expectation-value function is contained in the interval $[\lambda_{min}(A), \lambda_{max}(A)]$, and hence choosing, for example $\sigma := (\lambda_{max}(A) + \lambda_{min}(A))/2$, and $(\lambda_{max}(A) - \lambda_{min}(A))/2$ will work.

That the Fourier spectrum of the complex-valued expectation-value function is contained in the interval $[\lambda_{min}(A), \lambda_{max}(A)]$ in the case of FIG. 4 can be seen using standard mathematical manipulations, taking as a starting point that the operator-valued function $\theta \mapsto e^{i(\theta A+B)/\hbar}$ has a Fourier spectrum that is contained in the interval $[\lambda_{min}(A), \lambda_{max}(A)]$; this fact can be proven using the Lie-Trotter product formula.

There is some freedom in the choice of K and it is a tunable parameter of the method 150. The width 2K of the interval influences the efficiency of the method: The variance of the estimator for the derivative increases when K is increased, and the magnitudes of the parameter shifts decrease when K is increased. In some examples, such as the second and third exemplary methods below, the magnitudes of the parameter shifts or parameter values may stay the same, but an approximation error may decrease with increasing K.

The method will continue to work if the Fourier spectrum extends slightly beyond the interval [φ−K, φ+K] but an approximation error will be introduced depending on the magnitude of these deviations.

FIG. 5 illustrates the steps required to implement the method 150.

In step S502, a real number K is determined and a phase factor φ are chosen such that the Fourier expansion spectrum of the expectation value function is contained in [φ−K, φ+K], as described earlier. These values may be determined by an implementor and input to the classical computing system, or may be determined by the classical computing system by, for example, use of an algorithm or a look-up table.

In step S504, a sub-multi-set of shift values is produced by constructing
a finite sub-multi-set S of the set of real numbers $$\left\{ \frac{\left(n - \frac{1}{2}\right)}{2K} \middle| n \in \mathbb{Z} \right\}.$$

In step S506, a sub-multi-set of trial control parameter values is produced by taking the current value of the selected parameter, denoted here as $\theta_0$, and calculating trial parameter value $\theta = \theta_0 - s$ for each shift value $s \in S$.

In step S508 a sub-multi-set of weighting values $q_s$ is produced, where the weighting values correct deviations of the frequency statistics of S from the target probability distribution $$P(s) = \frac{1}{(2\pi K s)^2}$$

on the set $$\left\{ \frac{\left(n - \frac{1}{2}\right)}{2K} \middle| n \in \mathbb{Z} \right\}.$$

In step S510, the parameterised quantum evolution is performed as described in FIG. 2 steps S202-S210 for each of the trial control parameter values. The measurement result $F_s$ is stored, for example in the measurement result storage 119.

In step S512, it is determined whether a phase correction factor is required. It may not be required when φ=0, or if φ≈0 in the case of some physically irrelevant error is allowed.

If no such phase correction factor is required, in S520a the derivative is obtained by calculating the sum $$\Sigma 2\pi K(-1)^{2Ks+1/2} F_s q_s$$

where the measurement results $F_s$ are weighted by their corresponding weighting value $q_s$ and a summation factor $2\pi K(-1)^{2Ks+1/2}$.

If such a phase correction factor is required, in S514 for each shift value $s \in S$ the measurement result $F_s$ is multiplied by phase correction factor $e^{-i(\theta_0-s)\varphi/\hbar}$. The derivative of the cost function scaled by the phase factor, is then obtained in S520b by calculating the sum $$\Sigma 2\pi K(-1)^{2Ks+1/2} F_s q_s.$$

Steps S504-508 are carried out on the processor 102 of the classical computation system 110, before communicating the trial parameter values at S510 to the quantum computation system 120. The quantum control hardware 122 then utilises the state preparation module 124, the state evolution module 126 and the quantum measurement module 128 to process the controlled quantum system 140 as described above. The measurement results resulting from S510 are communicated back from the quantum computation system 120 to the classical computation system 110. Steps S512, S514 and S520a/b are carried out on the processor 102 of the classical computation system 110.

In Step S502, the choice of the value of K allows to tune the standard deviation of the method 150 versus the magnitudes of the shifts in the θ-values produced in S504 and S506. Decreased magnitudes of shifts lead indirectly to decreased magnitudes of the θ-values. In some examples, it is desirable to keep the magnitudes of θ-values low because the magnitude of the θ-values correlate with intensities of control pulses, and higher intensity of control pulses can sometimes cause noise in the quantum computation. It is important to highlight that K does not necessarily need to be based on the largest and smallest eigenvalues, and values within the interval may be more or as appropriate depending on the system and/or algorithm the method is employed in.

In Step S504, the sub-multi-set S can be constructed randomly or deterministically. Providing an appropriate set of weighting values $q_s$ which correct the frequency statistics of S to the targeted probability distribution $$P(s) = \frac{1}{(2\pi K s)^2}$$

is constructed, the skilled person will be able to think of several methods for constructing S.

As a first exemplary method of constructing S, a positive integer N is chosen which decides the variance of the estimated gradient by $O(1/\sqrt{N})$. A real number s is sampled N times from the targeted probability distribution on the set $$\left\{\frac{\left(n-\frac{1}{2}\right)}{2K}\,\middle|\, n \in \mathbb{Z}\right\},$$

and added to S. This allows the weighting value $q_s=1$ for each $s \in S$.

As a variant of the first exemplary method, pairs are sampled by sampling N times from the probability distribution $$P(s) = \frac{2}{(2\pi K s)^2}$$

on the set $$\left\{\frac{\left(n-\frac{1}{2}\right)}{2K}\,\middle|\, n \in \mathbb{Z}, n \geq 1\right\}$$

and s and $-s$ are added to S. This allows the weighting value $q_s=1$, $q_{-s}=1$ for each $s \in S$.

As a second exemplary method of constructing S, a positive integer N is chosen which decides the bias (approximation error) of the estimator. The set S is instead deterministically constructed by choosing the numbers $s=(n-\frac{1}{2})/2K$ where n ranges from $-N+1, \ldots, +N$. The weighting values $q_s$ are set to $$q_s = \frac{1}{(2\pi K s)^2}$$

for each $s \in S$. This results in a biased estimator with approximation error $O(1/N)$.

As a third exemplary method for constructing S, a positive integer T and a positive integer $N >> 2T$ are chosen. S is constructed deterministically or semi-deterministically to have N elements, which are distributed among the real numbers $$\left\{\frac{\left(n-\frac{1}{2}\right)}{2K}\,\middle|\, n \in \mathbb{Z}, n \geq 1\right\} \cap [-(T-1/2)/2K, +(T-1/2)/2K]$$

by taking s $N_s$ times, in such a way as to minimise the variance of the resulting random variable $$\sum_{\substack{s \in \{(n-\frac{1}{2})/2K | n \in \mathbb{Z}, n \geq 1\} \cap \\ [-(T-1/2)/2K, +(T-1/2)/2K]}} \frac{(-1)^{2Ks+\frac{1}{2}}}{\pi(2Ks)^2} Avg_{N_s}(F_s)$$

where $Avg_{N_s}(F_s)$ denotes the average of N independent copies (i.e. sample repetitions) of the random variable X. The number of times the real number s is chosen, $N_s$, is proportional to $2K|s|$ by rounding either deterministically or randomly—for example, for choosing randomly between two numbers from $\{\lfloor x \rfloor, \lceil x \rceil\}$, the smaller number $\lfloor x \rfloor$ is chosen with probability $\lceil x \rceil - x$ and the larger number $\lceil x \rceil$ is chosen with probability $x - \lfloor x \rfloor$. The weighting values $q_s$ for approximately correcting the frequency statistics can be set to $$q_s = \frac{1}{(2\pi K s)^2}$$

for all $s \in S$. Another possibility is to correct the individual rounding for each s. In this method, the variance of the resulting estimator is $O(1/N)$, the approximation error (bias) is $O(1/T)$, and, on average, the magnitudes of the shifts that are used $2 \log(T)+O_K(1)$.

It is clear to the person skilled in the art that the choice of N to determine the size of S depends on the desired level of accuracy for the gradient, as the variance of the estimated gradient is $O(1/\sqrt{N})$ using the disclosed method. For example, early on in the optimisation process a small value of N may be chosen, such as $N=10$. As a local optimum gradient is reached, the value of the gradient being small, N is increased as it becomes worthwhile to execute many repetitions to obtain a good estimate of the gradient, such as $N=1000$. This choice may be made by the implementor and input to the classical computing device, or determined by an algorithm such as the stochastic gradient descent algorithm, for example.

It can be advantageous to determine tuneable parameters K, N, and where applicable T, in such a way as to balance the limitations of the quantum device, such as a preference for small magnitudes of shifts, with the bias and variance of the estimator depending on, for example, the intended use of the resulting derivative estimator.

Crucially, the disclosed method 150 does not require an adjustment of the parameterised quantum evolution beyond modification of the parameters.

As described regarding the choice of the value of K in S502, it can be desirable to restrict the magnitude of θ-values. This may correspond to control parameter values which are, for example, physically more straightforward to implement or less susceptible to noise and/or other sources of error. One way to address this is through using a variation of the Nyquist-shift method 150 which utilises a folding function.

A p-folding function, or parameter-folding function, for a given positive real number p, is a partial or total function $\tau: \mathbb{R} \to \mathbb{R}$ with the property that for all $s \in S_K$, we have $\tau(s) \approx s$ mod $p\mathbb{Z}$. The idea of the folding function is that if γ is an approximate common divisor of the eigenvalues of A, and $1/\gamma$ divides p (e.g. $p=1/\gamma$, $p=2/\gamma$, ...) then, for large θ-values, p is an approximate period of expectation values of the measurements as a function of θ. One way of using the folding function τ is, therefore, to map large θ-values to smaller ones whilst not disturbing the approximately p-periodic contributions to the derivative. This can be used to ensure that no trial control parameter value differs from the first control parameter value by more than a parameter shift limit, the parameter shift limit representing the largest acceptable magnitude of parameter shift to the user or algorithm.

Figure 6:
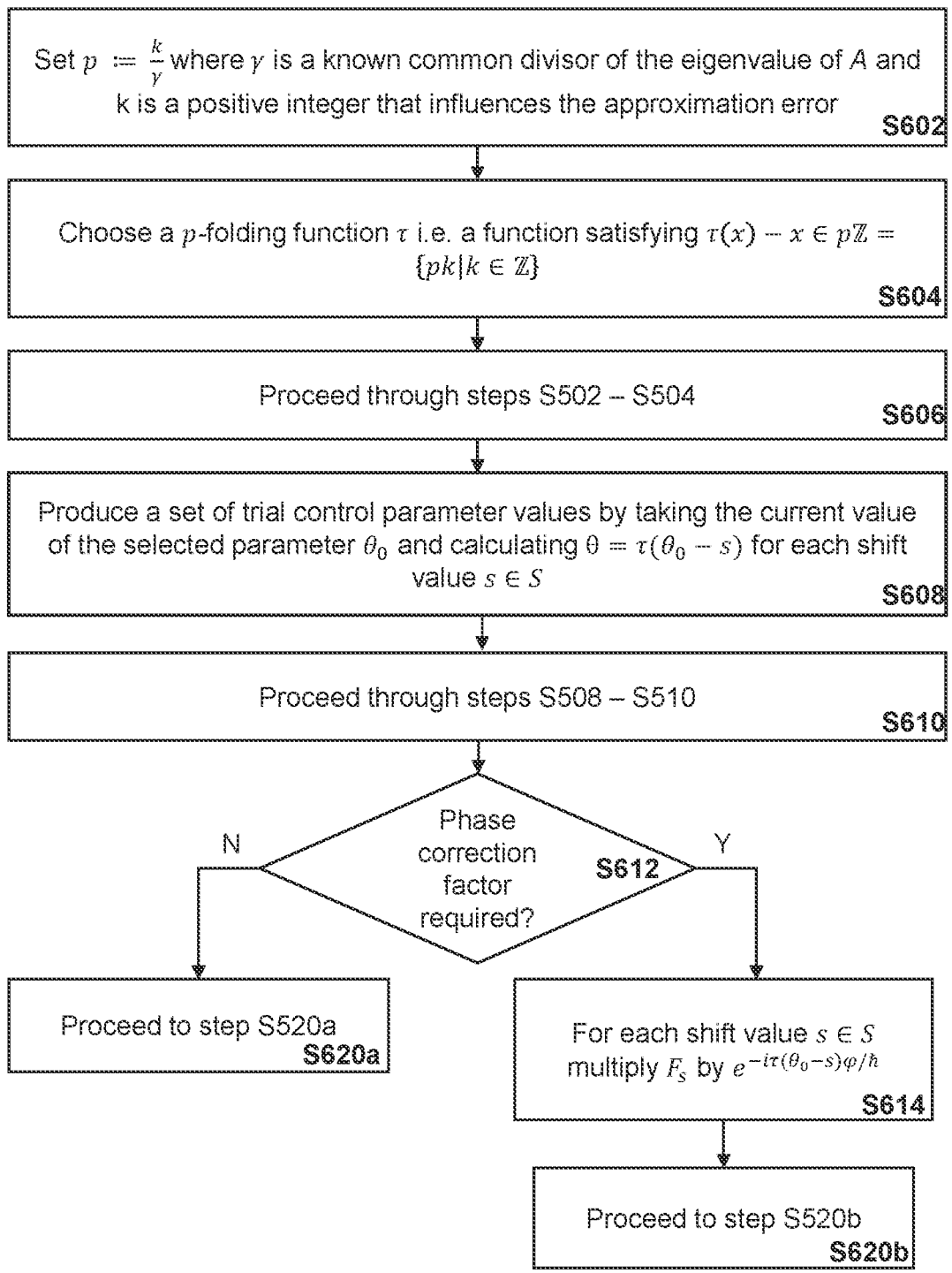
FIG. 6 is a flow chart showing steps performed in implementing a Folding variant of the Nyquist-shift method described herein.

FIG. 6 illustrates the steps of a folding-Nyquist-shift method 150*b*.

In step S602, a positive real number p is decided on, which is an integer multiple of a reciprocal of the known common divisor γ of the eigenvalues of A. In other words, $$p := \frac{k}{\gamma}$$

where k is a positive integer.

In step S604, a p-folding function is chosen. A p-folding function is a function that satisfies $\tau(x)-x \in p\mathbb{Z}=\{pk|k \in \mathbb{Z}\}$. An example is to let T compute the unique number in $$\left[-\frac{p}{2}, +\frac{p}{2}\right[$$

that is congruent to θ mod p:

$$\tau(x) := \text{unique element of } (x + p\mathbb{Z}) \cap \left[-\frac{p}{2}, +\frac{p}{2}\right[$$

The person skilled in the art will be able to think of a variety of functions which achieve the goal of reducing the magnitudes of the θ-value function. Through selection of the folding function τ a particular balance of small magnitude θ-values and a small approximation error may be struck in accordance with the requirements of the system or algorithm in which the method is implemented.

In step S606, the steps of S502-S504 are carried out, choosing a real number K and a phase correction factor φ and producing a sub-multi-set of shift values S.

In step S608, a sub-multi-set of trial control parameter values are produced by taking the current value of the selected control parameter $\theta_0$ and calculating $\theta=\tau(\theta_0-s)$ for each shift value $s \in S$, implanting the folding function to ensure the values of θ remain within chosen bounds.

In step S610, steps S508-510 are carried out. This produces the sub-multi-set of weighting values and, for each trial control parameter value, performs the parameterised quantum evolution steps to produce a set of measurement values F.

Step 612 is identical to S512, and simply involves determining whether a phase correction factor is required.

In step S614, where a phase correction factor is required, in a similar manner to that described in S514 for each shift value $s \in S$ the measurement result $F_s$ is multiplied by $e^{-2\pi i \tau(\theta_0-s)\varphi}$, differing from S514 in that the folding function appears in the exponent.

Steps S620a and S520b are analogous to S520a and 520b.

Figure 7:
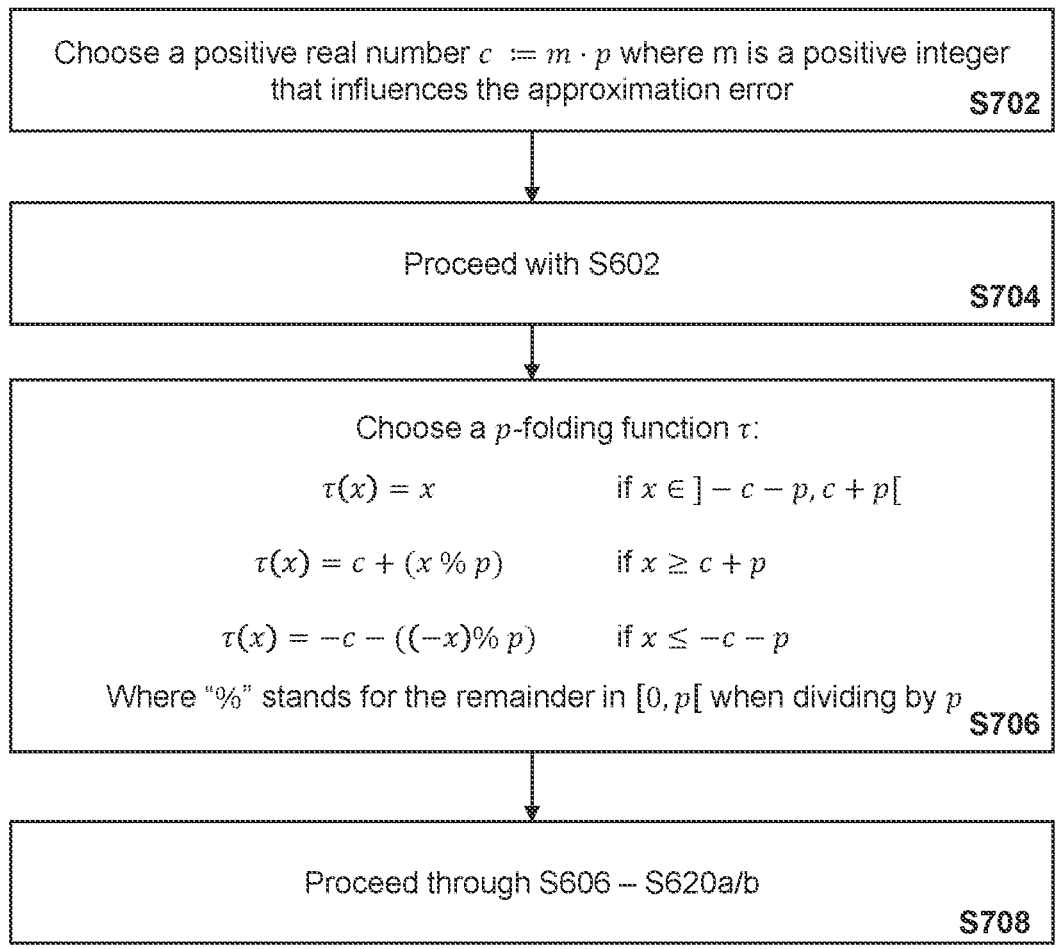
FIG. 7 is a flow chart showing steps performed in implementing a variant of the Folding-Nyquist-shift method described herein.

FIG. 7 depicts a specific variant of the process described by FIG. 6 by using one folding function in particular, known as a (p,c)-folding function. This introduces a further tunable parameter c which a person skilled in the art may tune to adapt for a particular use. The value c also influences both the approximation error (like K) and the magnitude of the θ-values.

In step S702, a positive real number c=m·p is chosen, where m is a positive integer.

In step S704, the process as described by S602 is carried out.

In step S706, the specific (p,c)-folding function is implemented. This function is defined as $$\tau(x) = \begin{cases} -c - ((-x) \% p), & \text{if } x \leq -c - p; \\ x, & \text{if } x \in ]-c-p, +c+p[; \\ +c + (x \% p), & \text{if } x \geq +c + p. \end{cases}$$

where % p stands for the remainder in [0, p[ when dividing by p. By use of this function, p determines a range where the approximation error is particularly low, while c determines the magnitude of the approximation error.

In step S708, the remaining steps S606-620a/b are carried out.

The above embodiments are to be understood as illustrative examples of the invention. Further embodiments of the invention are envisaged. For example, the method has been described in the context of quantum computations, but it may also be applied in the context of characterisation or control of quantum systems. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for performing a parameterised quantum evolution for a quantum system associated with a hybrid computing system having a quantum computing system and a classical computing system, wherein the quantum computing system comprises a quantum system having one or more quantum devices, the method comprising estimating a derivative of a parameter-dependent physical quantity that is dependent on a first control parameter θ of the parameterised quantum evolution by:

on the classical computing system:

determining a finite sub-multi-set S from the set of shift values $$\left\{ \frac{\left(n - \frac{1}{2}\right)}{2K} \Bigg| n \in \mathbb{Z} \right\},$$

wherein K is a bounding value defining the interval [φ−K, φ+K] which contains the Fourier spectrum of an expectation-value function $f(\theta)$ of the first parameterised unitary quantum evolution, where φ is a phase-correction value;

determining a finite sub-multi-set of weighting values $q_s$ each weighting value corresponding to a shift value s from the sub-multi-set of shift values S;

wherein the sub-multi-set of shift values and the respective sub-multi-set of weighting values are determined in accordance with a targeted probability distribution $$P(s) = \frac{1}{(2\pi K s)^2};$$

calculating a sub-multi-set of trial control parameter values, each trial control parameter value generated by combining a respective shift value s from the sub-multi-set of shift values S with the first value of the first control parameter $\theta_0$;

calculating a sub-multi-set of summation factors $d_s$, each summation factor $d_s = 2\pi K(-1)^{2Ks+1/2}$ for a respective shift value s from the sub-multi-set of shift values S;

for each trial control parameter value:
communicating the trial control parameter value from the classical computing system to the quantum computing system; and on the quantum computing system:
subjecting the quantum system to a parameterised unitary quantum evolution with the first control parameter of the parameterised unitary quantum evolution set to the trial control parameter value;
making a quantum measurement on the quantum state to obtain a parameter-dependent physical quantity $F_s$;
communicating the parameter-dependent physical quantity to the classical computing system; and on the classical computing system:
calculating a phase-corrected measurement result $F_{s\varphi}$ for each shift value s by calculating $F_s e^{-2\pi i(\theta_0 - s)\varphi}$; and
calculating the estimate of the derivative of $f_\varphi(\theta) = e^{-2\pi i(\theta)\varphi} f(\theta)$ with respect to the first control parameter through the summation $$f'_\varphi(\theta_0) = \sum_{s \in S} d_s q_s F_{s\varphi}.$$

2. The method of claim 1, wherein the phase-correction value is zero such that the interval which contains the Fourier spectrum of the expectation-value function of the first parameterised unitary quantum evolution is defined by [−K, +K], the phase-corrected measurement result $F_s e^{-2\pi i(\theta_0 - s)\varphi} = F_s$, and the estimate of the derivative calculated by the classical computing system is $$f'(\theta_0) = \sum_{s \in S} d_s q_s F_s.$$

3. The method of claim 1, wherein the method further comprises calculating the estimate of the derivative of the expectation-value function $f'(\theta_0)$ from $f'_\varphi(\theta_0)$.

4. The method of claim 1, wherein generating the sub-multi-set of shift values and the sub-multi-set of weighting values according to a targeted probability distribution involves:

until a target size N of the sub-multi-set of shift values is reached: randomly sampling a first sampled value s from $$\left\{ \frac{\left(n - \frac{1}{2}\right)}{2K} \,\bigg|\, n \in \mathbb{Z} \right\}$$

according to the targeted probability distribution $$P(s) = \frac{1}{(2\pi K s)^2},$$

and adding the first sampled value s to the sub-multi-set of shift values S; and setting all weighting values $q_s$ to unity.

5. The method of claim 1, wherein generating the sub-multi-set of shift values and the sub-multi-set of weighting values according to a targeted probability distribution involves:

until a target size N of the sub-multi-set of shift values is reached: randomly sampling a first sampled value s from $$\left\{ \frac{\left(n - \frac{1}{2}\right)}{2K} \,\bigg|\, n \in \mathbb{Z}, n \geq 1 \right\},$$

according to the targeted probability distribution $$P(s) = \frac{2}{(2\pi K s)^2},$$

and adding the first sampled value s and the additive inverse of the sampled value −s to the sub-multi-set of shift values; and setting all weighting values $q_s$, $q_{-s}$ to unity.

6. The method of claim 1, wherein generating the sub-multi-set of shift values and the sub-multi-set of weighting values according to a targeted probability distribution involves:

selecting a target size N,
constructing a set of values $$S = \left\{ \frac{\left(n - \frac{1}{2}\right)}{2K} \,\bigg|\, n \in \mathbb{Z} \right\}$$

for n = −N+1, ..., N;
and determining weighting values $$q_s = \frac{1}{(2\pi K s)^2}.$$

7. The method of claim 1, wherein generating the sub-multi-set of shift values and the sub-multi-set of weighting values according to a targeted probability distribution involves:

selecting a target size N,
selecting a positive integer T much smaller than half the target size,
constructing a set of values $$S = \left\{ \frac{\left(n - \frac{1}{2}\right)}{2K} \,\bigg|\, n \in \mathbb{Z}, n \geq 1 \right\} \cap [-(T - 1/2)/2K, +(T - 1/2)/2K]$$

by taking s $N_s$ times in such a way as to minimise the variance of the random variable $$\sum_{\substack{s\in\{(n-\frac{1}{2})/2K|n\in\mathbb{Z},n\geq 1\}\cap \\ [-(T-1/2)/2K, +(T-1/2)/2K]}} \frac{(-1)^{2Ks+\frac{1}{2}}}{\pi(2Ks)^2} \text{Avg}_{N_s}(F_s).$$

8. The method of claim 1, wherein calculating a sub-multi-set of trial control parameter values further comprises passing each trial control parameter value through a parameter-folding function, to modify the value of the trial control parameter value such that no trial control parameter value differs from the first control parameter value by more than a parameter shift limit value.

9. The method of claim 8, wherein parameter-folding function has the property $\tau(x)-x \in p\,\mathbb{Z}=\{pk|k \in \mathbb{Z}\}$, where $$p := \frac{k}{\gamma},$$

where $\rho$ is a real number, k is a positive integer and $\gamma$ is a is a common divisor of the eigenvalues of the first parameterised quantum evolution.

10. The method of claim 9, wherein the parameter-folding function is $$\tau(x) = \begin{cases} -c - ((-x)\%p), & \text{if } x \leq -c - p; \\ x, & \text{if } x \in ]-c-p, +c+p[; \\ +c + (x\%p), & \text{if } x \geq +c+p \end{cases}$$

where c is a real number, c=m·p where m is a positive integer, and where % p stands for the remainder in [0, p[ when dividing by p.

11. The method of claim 1, wherein the bounding value K is based on the largest and smallest eigenvalue of the first parameterised quantum evolution.

12. A hybrid computing system comprising a classical computing system and a quantum computing system, the quantum computing system comprising a quantum system having one or more quantum devices, the hybrid computing system configured to:

on the classical computing system:
  determine a finite sub-multi-set S from the set of shift values $$\left\{ \frac{\left(n-\frac{1}{2}\right)}{2K} \middle| n \in \mathbb{Z} \right\},$$

wherein K is a bounding value defining the interval $[\varphi-K, \varphi+K]$ which contains the Fourier spectrum of the expectation-value function $f(\theta)$ of the first parameterised unitary quantum evolution, where $\varphi$ is a phase-correction value;
  determine a finite sub-multi-set of weighting values $q_s$ each weighting value corresponding to a shift value s from the sub-multi-set of shift values S;
  wherein the sub-multi-set of shift values and the respective sub-multi-set of weighting values are determined in accordance with a targeted probability distribution $$P(s) = \frac{1}{(2\pi Ks)^2};$$

calculate a sub-multi-set of trial control parameter values, each trial control parameter value generated by combining a respective shift value s from the sub-multi-set of shift values S with the first value of the first control parameter $\theta_0$;
  calculate a sub-multi-set of summation factors $d_s$, each summation factor $d_s=2\pi K(-1)^{2Ks+1/2}$ for a respective shift value s from the sub-multi-set of shift values S;
  for each trial control parameter value:
    communicate the trial control parameter value from the classical computing system to the quantum computing system; and
  on the quantum computing system:
    subject the quantum system to a parameterised unitary quantum evolution with the first control parameter of the parameterised unitary quantum evolution set to the trial control parameter value;
    make a quantum measurement on the quantum state to obtain a parameter-dependent physical quantity $F_s$;
    communicate the parameter-dependent physical quantity to the classical computing system; and
  on the classical computing system:
    calculate a phase-corrected measurement result $F_{s\varphi}$ for each shift value s by calculating $F_s e^{-2\pi i(\theta_0-s)\varphi}$; and
    calculate the estimate of the derivative of $f_\varphi(\theta)=e^{-2\pi i(\theta)\varphi}f(\theta)$ with respect to the first control parameter through the summation $$f'_\varphi(\theta_0) = \sum_{s \in S} d_s q_s F_{s\varphi}.$$

13. The hybrid computing system of claim 12, wherein the classical computing system is further configured to calculate the estimate of the derivative of the expectation-value function $f'(\theta_0)$ from $f_\varphi'(\theta_0)$.

14. The hybrid computing system of claim 12, wherein the classical computing system is further configured to generate the sub-multi-set of shift values and the sub-multi-set of weighting values according to a targeted probability distribution by:
  until a target size N of the sub-multi-set of shift values is reached: randomly sampling a first sampled value s from $$\left\{ \frac{\left(n-\frac{1}{2}\right)}{2K} \middle| n \in \mathbb{Z} \right\}$$

according to the targeted probability distribution $$P(s) = \frac{1}{(2\pi Ks)^2},$$

and adding the first sampled value s to the sub-multi-set of shift values S; and
setting all weighting values $q_s$ to unity.

15. The hybrid computing system of claim 12, wherein the classical computing system is further configured to generate the sub-multi-set of shift values and the sub-multi-set of weighting values according to a targeted probability distribution by:

until a target size N of the sub-multi-set of shift values is reached: randomly sampling a first sampled value s from $$\left\{ \frac{\left(n - \frac{1}{2}\right)}{2K} \middle| n \in \mathbb{Z}, n \geq 1 \right\},$$

according to the targeted probability distribution $$P(s) = \frac{2}{(2\pi Ks)^2},$$

and adding the first sampled value s and the additive inverse of the sampled value −s to the sub-multi-set of shift values; and setting all weighting values $q_s$, $q_{-s}$ to unity.

16. The hybrid computing system of claim 12, wherein the classical computing system is further configured to generate the sub-multi-set of shift values and the sub-multi-set of weighting values according to a targeted probability distribution by:

selecting a target size N,
constructing a set of values $$S = \left\{ \frac{\left(n - \frac{1}{2}\right)}{2K} \middle| n \in \mathbb{Z} \right\}$$

for n=−N+1, . . . , N;
and determining weighting values $$q_s = \frac{1}{(2\pi Ks)^2}.$$

17. The hybrid computing system of claim 12, wherein the classical computing system is further configured to generate the sub-multi-set of shift values and the sub-multi-set of weighting values according to a targeted probability distribution by:

selecting a target size N,
selecting a positive integer T much smaller than half the target size,
constructing a set of values $$S = \left\{ \frac{\left(n - \frac{1}{2}\right)}{2K} \middle| n \in \mathbb{Z}, n \geq 1 \right\} \cap [-(T - 1/2)/2K, +(T - 1/2)/2K]$$

by taking s $N_s$ times in such a way as to minimise the variance of the random variable $$\sum_{\substack{s \in \{(n-\frac{1}{2})/2K | n \in \mathbb{Z}, n \geq 1\} \cap \\ [-(T-1/2)/2K, +(T-1/2)/2K]}} \frac{(-1)^{2Ks+\frac{1}{2}}}{\pi(2Ks)^2} Avg_{N_s}(F_s).$$

18. The hybrid computing system of claim 12, wherein the classical computing system is further configured to pass each trial control parameter value through a parameter-folding function, to modify the value of the trial control parameter value such that no trial control parameter value differs from the first control parameter value by more than a parameter shift limit value.

19. The hybrid computing system of claim 18, wherein the parameter folding function has the property τ(x)−x∈p $\mathbb{Z}$={pk|k∈ $\mathbb{Z}$}, where $$p := \frac{k}{\gamma},$$

where p is a real number, k is a positive integer and γ is a is a common divisor of the eigenvalues of the first parameterised quantum evolution.

20. The hybrid computing system of claim 19, wherein the parameter-folding function is $$\tau(x) = \begin{cases} -c - ((-x)\%p), & \text{if } x \leq -c - p; \\ x, & \text{if } x \in ]-c - p, +c + p[; \\ +c + (x\%p), & \text{if } x \geq +c + p \end{cases}$$

where c is a real number, c=m·p where m is a positive integer, and
where % p stands for the remainder in [0, p[ when dividing by p.

* * * * *